(12) United States Patent
Orf et al.

(10) Patent No.: US 8,801,302 B2
(45) Date of Patent: Aug. 12, 2014

(54) CAMERA STABILIZER

(71) Applicant: The Tiffen Company, LLC, Hauppauge, NY (US)

(72) Inventors: H. Robert Orf, Simi Valley, CA (US); Frank A. Rush, Birmingham, AL (US)

(73) Assignee: The Tiffen Company, LLC, Hauppauge, NY (US)

( * ) Notice: Subject to any disclaimer, the term of this patent is extended or adjusted under 35 U.S.C. 154(b) by 0 days.

(21) Appl. No.: 14/087,256

(22) Filed: Nov. 22, 2013

(65) Prior Publication Data

US 2014/0147104 A1 May 29, 2014

Related U.S. Application Data

(60) Provisional application No. 61/729,898, filed on Nov. 26, 2012.

(51) Int. Cl.
*G03B 17/56* (2006.01)

(52) U.S. Cl.
USPC .......................................... 396/421

(58) Field of Classification Search
USPC ................... 396/420, 421; 352/243; 348/376
See application file for complete search history.

(56) References Cited

U.S. PATENT DOCUMENTS

| 4,946,272 | A | * | 8/1990 | Brown | 352/243 |
| 5,752,112 | A | * | 5/1998 | Paddock et al. | 396/421 |
| 2004/0233389 | A1 | * | 11/2004 | Bruggaier | 352/243 |
| 2011/0170851 | A1 | * | 7/2011 | Orf et al. | 396/421 |
| 2012/0002062 | A1 | * | 1/2012 | Brown et al. | 348/208.99 |
| 2012/0106941 | A1 | * | 5/2012 | Greaves et al. | 396/421 |

* cited by examiner

*Primary Examiner* — WB Perkey
(74) *Attorney, Agent, or Firm* — Schnader Harrison Segal & Lewis LLP

(57) ABSTRACT

A camera stabilizer having a camera mount for attaching and positioning a camera, a gimbal component disposed below the camera mount and positioned at or near the center of gravity and a balancing arm. A handle is offset from a line through the center of gravity of the stabilizer plus camera. Adjustable weights are provided in a balancing arm to vary the center of gravity location.

20 Claims, 16 Drawing Sheets

US 8,801,302 B2

CAMERA STABILIZER

This application claims priority to U.S. Provisional Application having Ser. No. 61/729,898, filed Nov. 26, 2012, and entitled Camera Stabilizer.

BACKGROUND OF THE INVENTION

Currently commercialized stabilizers exist that are portable but there still exists a need for more compact products. Conventional stabilizers are generally grasped with one hand and directed via a control surface with either the same hand or the operator's second hand. The limiting factor in making these devices compact is the ability to actually grasp the handle and still have enough room to be able to get a second hand, or the fingers from the grasping hand, up to the control surface so that the operator can actually aim the camera.

With traditional handle designs, one handed operation is slightly more difficult, since trying to grip a straight handle and raise your fingers to contact the control surface(s) results in a less than ergonomic grip and slightly less than ideal way to lightly influence the cameras aim without disturbing the stability of it. Generally, the best way to lightly control the camera is with a natural/ergonomic two finger pinch using the thumb and index finger. Conventional stabilizers are not configured to provide such a natural hand positioning and movement. Accordingly, the need exists for a camera stabilizer that can be used with relatively small imaging devices yet allows for desired control of the stabilizer.

SUMMARY OF THE INVENTION

The invention includes a camera stabilizer having a handle disposed in a unique position with respect to the center of gravity. A camera mount for attaching and positioning a camera is disposed above a gimbal component that provides two or more degrees of freedom. The gimbal component is positioned at or near the center of gravity of the stabilizer plus camera. A balancing arm is provided that extends from or near the camera mount. The gimbal component has a housing with a control surface that the operator can access to control the stabilizer. The stabilizer's handle is offset from a vertical line through the center of gravity. The distance between the handle and the gimbal provided by the offset is such that when the handle is gripped by a user's hand, the user's fingers of that hand are within reach of the control surface allowing control of the camera stabilizer with the user's fingers. The offset may provide the ability to reduce the overall size of the stabilizer while allowing the user to adequately control of the apparatus. A guide element can be included on the control surface to facilitate optimum finger positioning.

Weights can be inserted into the balancing arm to adjust the center of gravity to a desired location. In an exemplary embodiment of the invention, an outer weight is disposed in the balancing arm and an inner weight is nested within the outer weight. One or both of the weights can be laterally adjusted to change the location of the center of gravity.

In an illustrative embodiment of the invention, a locking device is provided to lock the handle to the balancing arm. A notch in the handle complimentary in shape to an edge of the balancing arm is positioned so that when the handle is rotated toward the balancing arm edge, the balancing arm edge fits into the notch, thereby removeably securing the handle to the balancing arm. A spring-loaded, pin apparatus can be incorporated as the securing mechanism.

DESCRIPTION OF THE DRAWINGS

Illustrative embodiments of the invention are best understood from the following detailed description when read with the accompanying drawings.

DETAILED DESCRIPTION OF THE INVENTION

Figure 1A:
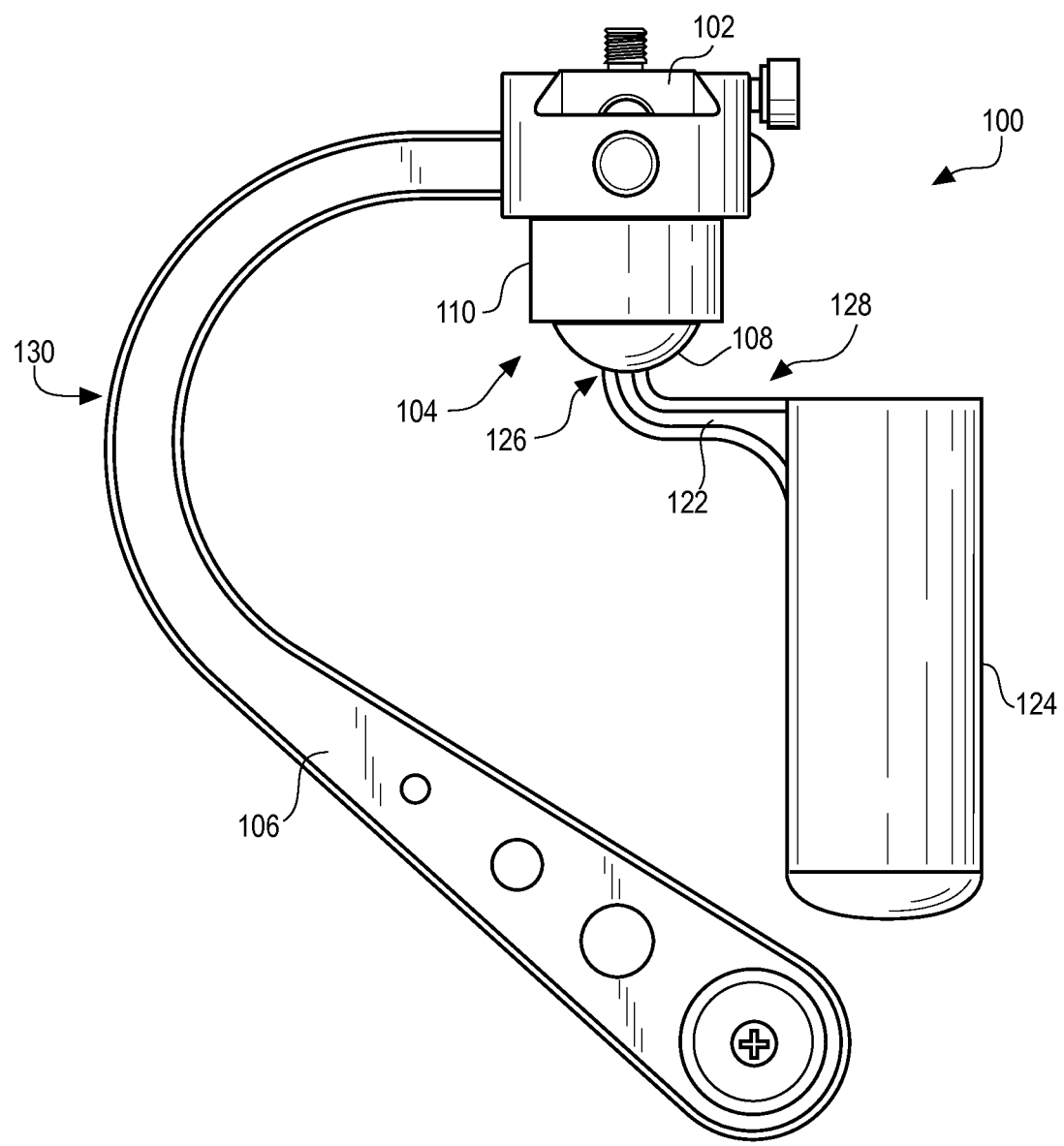
FIGS. 1A-B depict a camera stabilizer according to an illustrative embodiment of the invention.
Figure 1B:
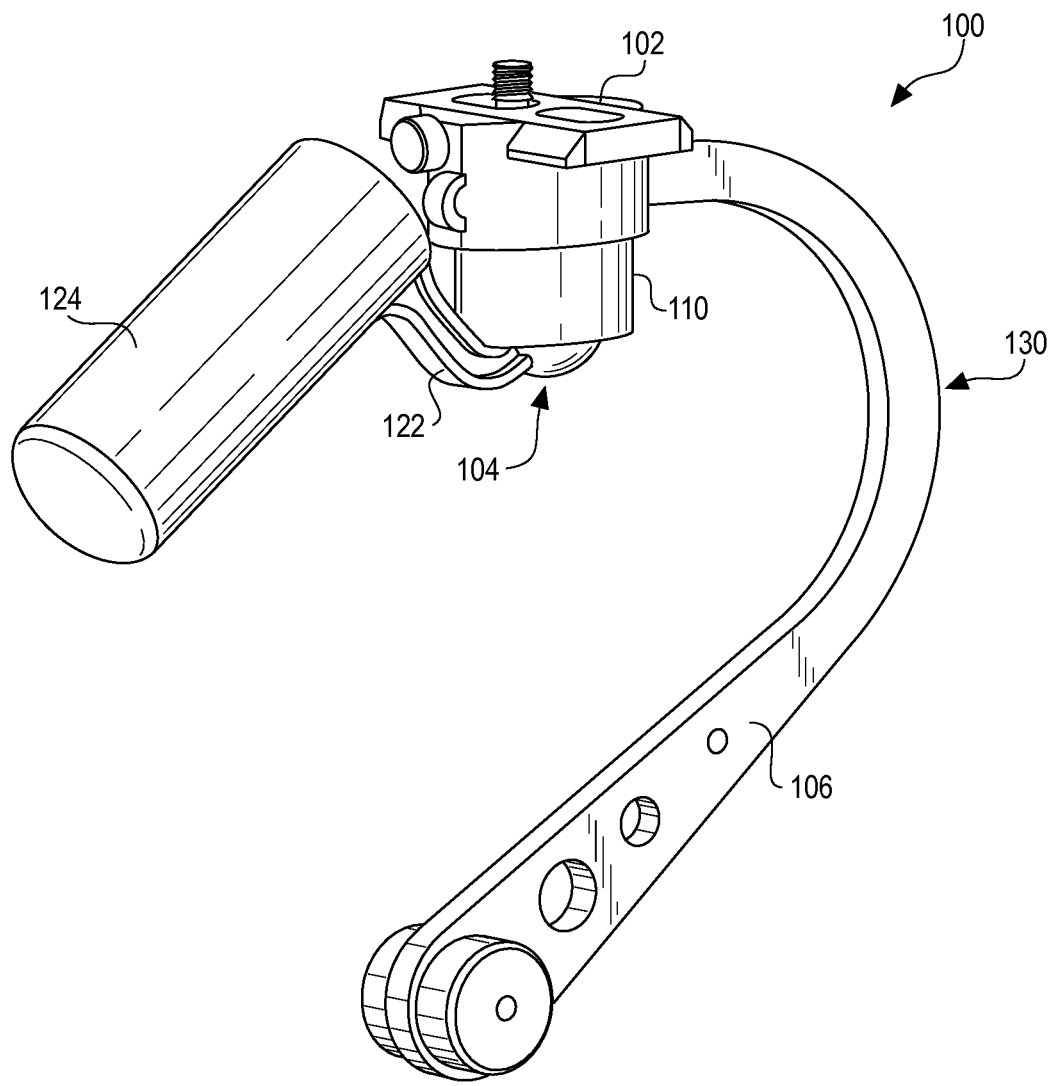

FIGS. 1A-B depict a camera stabilizer 100 according to an illustrative embodiment of the invention. The term "camera" is used herein broadly to mean "imaging device." Stabilizer 100 includes a camera mount 102 for attaching and positioning a camera to the apparatus. Gimbal component 104 is disposed below camera mount 102 and positioned at or near the center of gravity of the stabilizer plus camera. Gimbal component 104 includes a gimbal 108 rotationally seated in a housing 110. As shown in FIG. 1B handle 124 can be rotated via gimbal 104 while maintaining mount 102 in a substantially horizontal position. The excursion path of handle 124 will depend at least in part on the configuration of the handle and the handle offset, which is described below.

Figure 2:
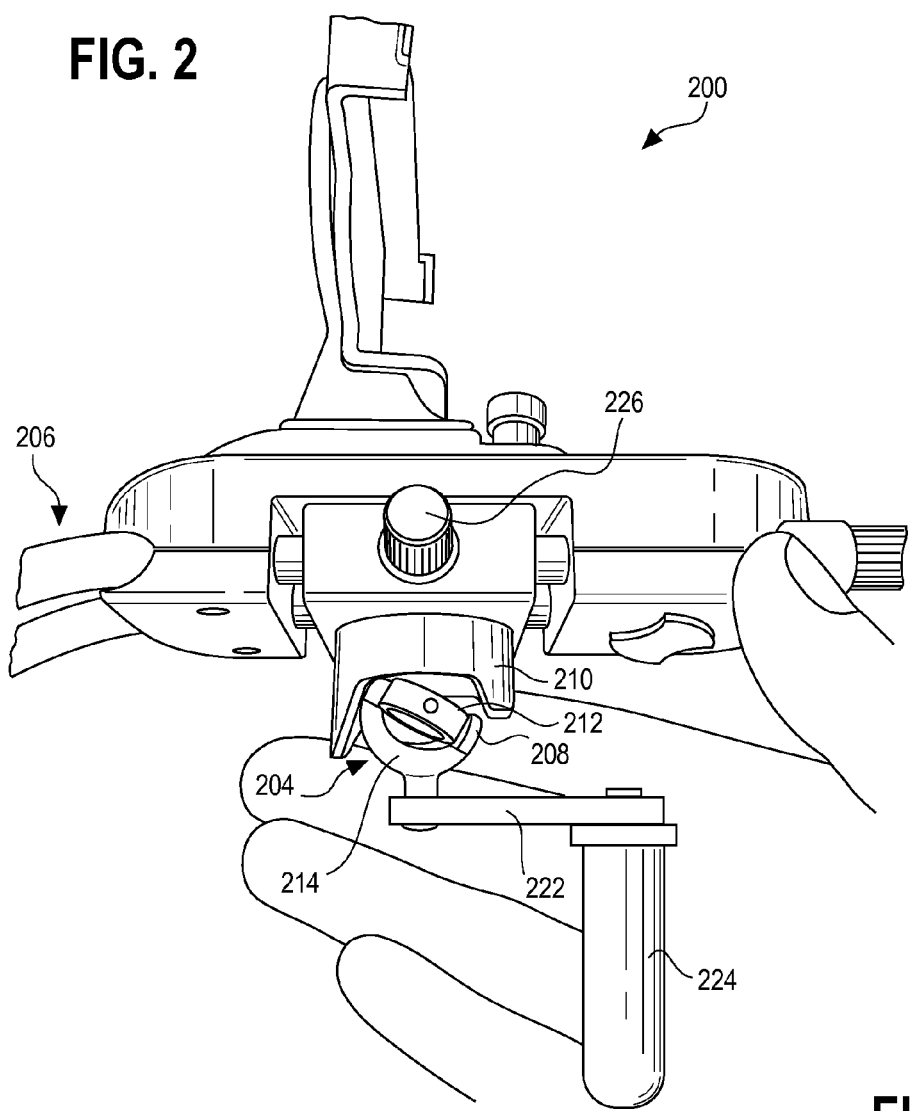
FIG. 2 depicts a camera stabilizer according to a further illustrative embodiment of the invention.

FIG. 2 depicts a camera stabilizer 200 according to a further illustrative embodiment of the invention that more clearly shows a gimbal apparatus 204. Gimbal apparatus 204 includes a gimbal 208 rotationally seated in housing 210. The exterior of housing 210 is a control surface that a user can access to affect the motion allowed by gimbal 208. Gimbal 208 includes an inner ring 212 rotationally attached to an outer gimbal element 214, which in turn is rotationally connected to housing 210. The gimbal can be of any configuration that allows the desired degrees of freedom and is compatible with the use and design of the camera stabilizer. An offset 222 displaces handle 224 from directly below gimbal 208

Camera stabilizer 100 includes a balancing arm 106 extending from mount 102 or an intermediary component, generally above the gimbal 108 or gimbal component 104. Balancing arm 106 is included to counter the weight distribution of other components, including the camera, so the gimbal is at the center of gravity of the stabilizer plus camera or in a chosen position with respect to the center of gravity. Balancing arm may be a single arm such as shown in FIGS. 1A-B or may have another configuration, such as for example, the dual rod balancing arm 206 shown in FIG. 2. Weights can be located in positions in addition to the end of balancing arm 106. For example, one or more weights can be disposed in the area designated generally as 130 in FIG. 1A to facilitate fine tuning Z adjustments, wherein mount 102 adjusts the camera position in the X-Y plane and the Z direction is mutually perpendicular to the X and Y directions. In an exemplary embodiment of the invention, area 130 is the portion of balancing arm 106 furthest from a plumb line through the center of gravity of the camera stabilizer plus camera.

Figure 3:
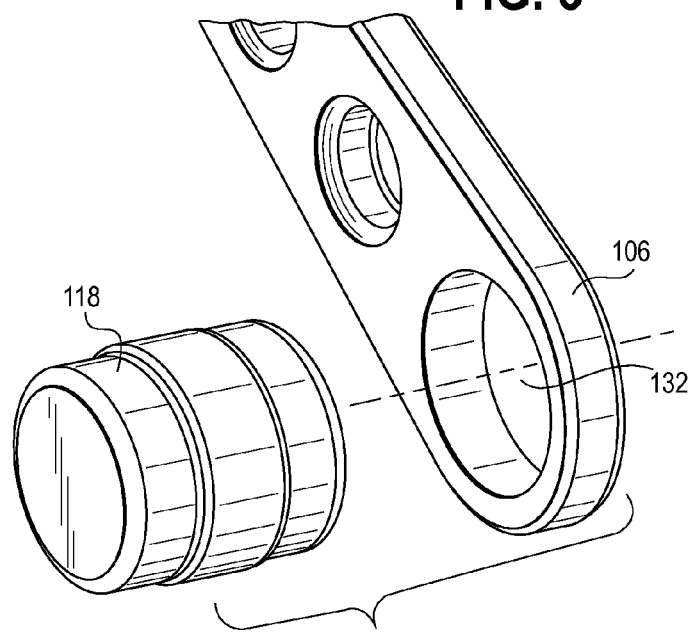
FIG. 3 depicts a weight adjustment system according to an illustrative embodiment of the invention.

FIG. 3 depicts a weight adjustment system according to an illustrative embodiment of the invention. A plurality of weights can be provided such as weight 118 that are insertable in or attachable to balancing arm 106. In the illustrative embodiment shown in FIG. 3, weight 118 is insertable in opening 132 of balancing arm 106. Additional openings are provided that can accommodate other weights. Weight 118 can be a single weight or can comprise more than one weight element, such as will be described with respect to FIGS. 4A-C. Placement or removal of one or more weights alters the center of gravity thereby locating it in a desirable position. Illustrative mechanisms for attaching weights can be by press fit insertion, threaded components or other attachment mechanisms that can hold the weights to the apparatus to allow them to be located as desired and remain during use of the stabilizer. The attachment device can include the ability to vary the "horizontal" or "X" distance of the weight within or with respect to balancing arm 106 to provide the ability to adjust the X balance of the stabilizer by varying the distribution of weight on either side of balancing arm 106.

Figure 4A:
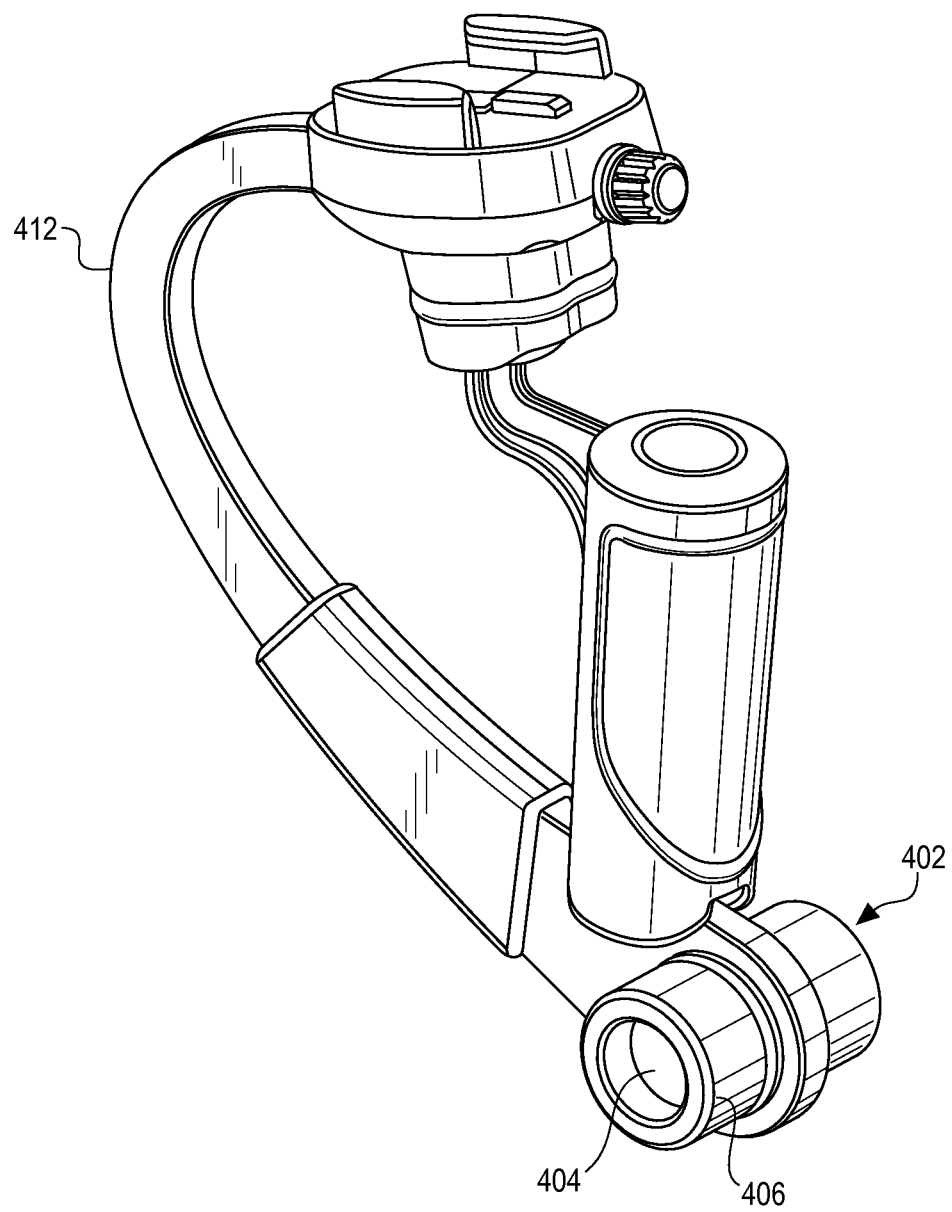
FIGS. 4A-C depicts a weight adjustment system according to a further illustrative embodiment of the invention.
Figure 4B:
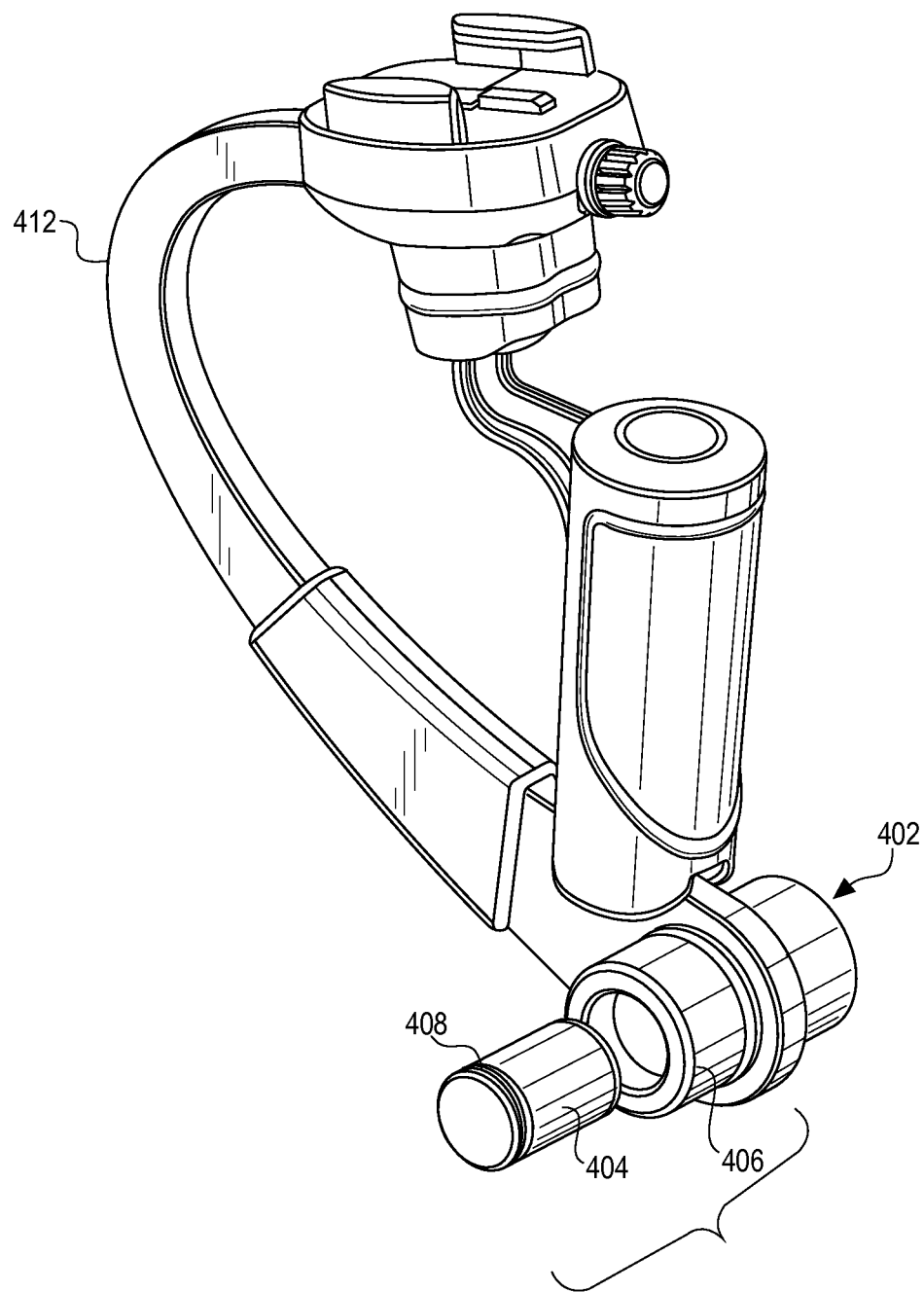

FIG. 4A depicts a further illustrative embodiment of a weight adjustment system. Weight 402 includes an inner weight 404 nested within an outer weight 406. Inner weight 404 can be moved along the X-axis (longitudinal axis of weight 402) to serve as a coarse balance adjustment. Outer weight 406 is adjustably inserted into balancing arm 412 so can also be moved along the X-axis to serve as a fine adjustment for balance with respect to the X axis. In an exemplary embodiment of the invention, inner weight 404 is held frictionally in place, being secure enough to reduce or eliminate accidental movement yet still allow it to be moved linearly as desired. O-ring 408, shown in FIG. 4B can be used to create a suitable amount of friction between inner weight 404 and outer weight 406. The o-ring can be disposed on the exterior of inner weight 404 or seated in the interior of outer weight 406. Preferably the friction will allow ease of movement of inner weight 404 with respect to outer weight 406, yet diminish or prohibit unwanted movement that would alter the desired balance. Inner weight 404 can be adjustably secured to outer weight 406 using mechanisms other than friction created by an o-ring. For example, the inner and outer weights may be engaged with one another by a threaded adjustable securing device. Any apparatus that provides the desirable ease of relative movement and reduction or elimination of unintentional movement is suitable.

Figure 4C:
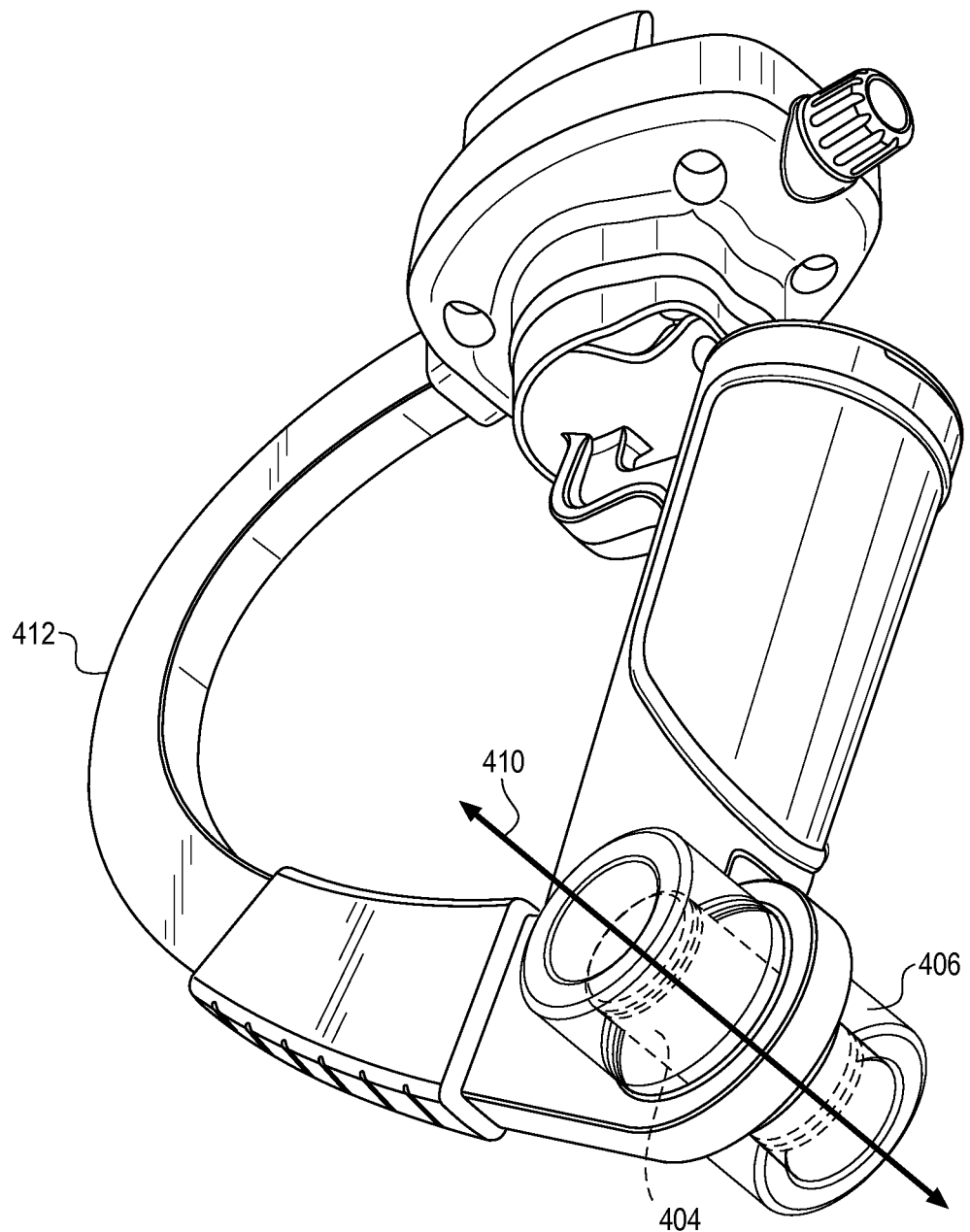

FIG. 4C is a schematic showing inner weight 404 disposed within outer weight 406. Inner weight 404 can be moved side to side along longitudinal axis 410 to adjust the system's side-to-side center of gravity.

The camera stabilizer can also be configured to balance a specific camera and thus not require or require only limited balancing adjustment mechanisms. The invention includes a camera with the stabilizer in both the adjustable and non-adjustable versions.

Figure 5:
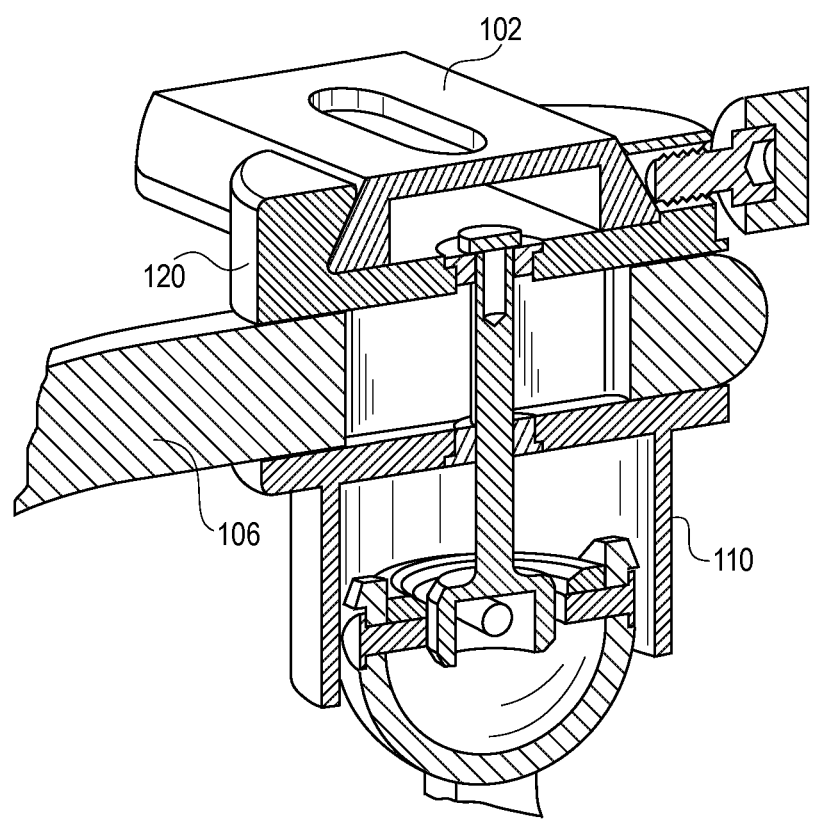
FIG. 5 depicts a cross section of a portion of a camera stabilizer according to an illustrative embodiment of the invention.

FIG. 5 depicts a cross section of a portion of a camera stabilizer showing positioning of balancing arm 106 according to an illustrative embodiment of the invention. Balancing arm 106 is slidably inserted into intermediary component 120. In this illustrative embodiment, intermediary component 120 is shown attached to mount 102 and gimbal housing 110. Balancing arm 106 can be adjusted by sliding it within intermediary component 120 to alter the center of gravity. In an illustrative embodiment of the invention, the balancing arm can be adjusted by a dialing or ratchet device. See for example, knob 226 in FIG. 2 and knob 626 in FIG. 6. Other weight redistribution mechanisms can be incorporated into the camera stabilizer to vary the center of gravity location. Systems to adjust the center of gravity will generally include a means of adding or removing weight and/or redistributing weight.

Figure 6:
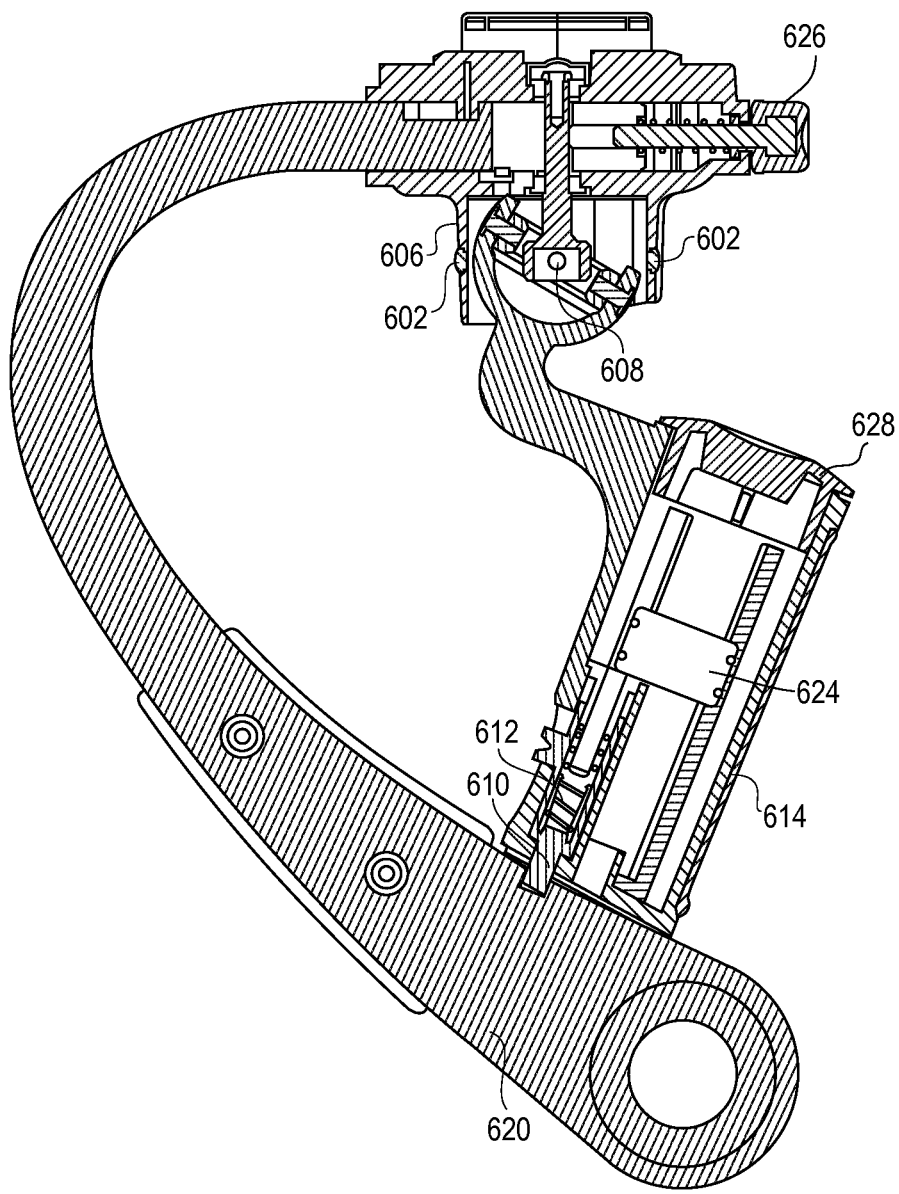
FIG. 6 is a cross-sectional view of a camera stabilizer according to an illustrative embodiment of the invention.

FIG. 6 depicts a cross section of a camera stabilizer according to an illustrative embodiment of the invention. A raised guide element 602 is provided on control surface 304 of gimbal housing 606. Guide element 602 facilitates an operator locating where control fingers should be placed for optimal performance and operation in most cases. The position of guide element 602 is preferably on or about at the center of gravity balance point of the system. The guide element generally will be best placed so that an operator will be guided to exert control pressure at about the level of gimbal pivot point 608 rather than above or below it, which could cause the system to have more of a tendency to tilt up or down than it would if pressure were directed on or about the balance point of the system. With a raised surface on or about the pivot point, the user's fingers will touch the raised element when accessing the control surface and thus help guide the direction of the force to a suitable or optimal position for control. It is noted that the system will usually be adjusted so that the pivot point coincides with the balance point of the system.

Guide element 602 may be, for example, in the form of a ring, i.e. circumventing the entire housing 606, or a partial ring. In general the guide element must merely provide a reference point for suitable finger placement.

Figure 7:
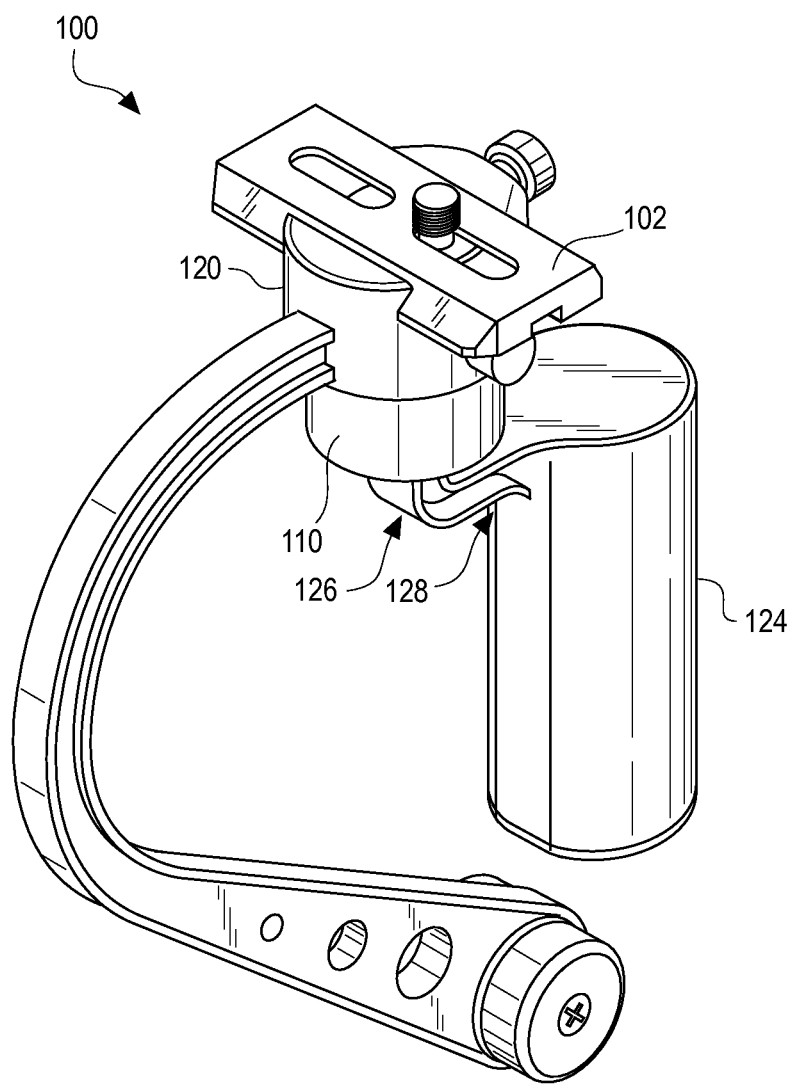
FIG. 7 depicts a camera stabilizer showing a mount according to an illustrative embodiment of the invention.

FIG. 7 depicts camera stabilizer 100 showing mount 102 according to an illustrative embodiment of the invention. Mount 102 is preferably adjustable, which adds another possible mechanism to alter the position of the center of gravity. Mount 102 is adjustable in one direction. Mounts have x-y or other adjustments can also be used.

Turning back to FIGS. 1A-B, handle offset 122 is shown extending from handle 124. Handle offset 122 displaces handle 124 from gimbal 108 and a vertical line through the center of gravity of the camera stabilizer plus camera. Handle offset 122 has a proximate end 126 and a distal end 128. Handle offset 122 extends from gimbal component 104 at the handle offset proximate end 126. Handle 124 extends from the handle offset distal end 128. The offset position of handle 124 provides a user with the ability to control the gimbal 108 with the same hand with which the user grasps handle 124. The operator's hand is no longer required to be directly under the camera payload and can be positioned off to the side allowing the entire stabilizer to be more compact as now less room is required to fit the user's hand in.

Figure 8A:
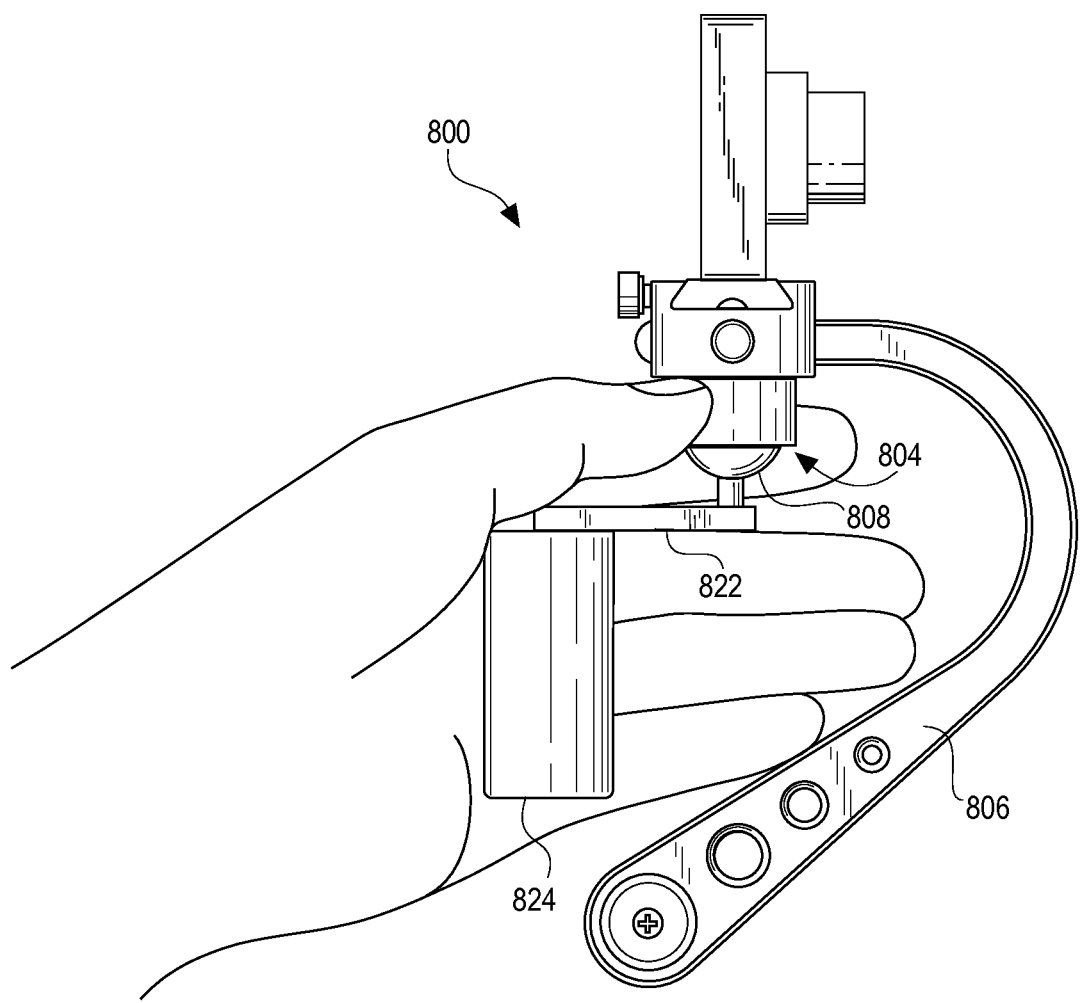
FIGS. 8A-C depict a camera stabilizer held by a user according to an illustrative embodiment of the invention.
Figure 8B:
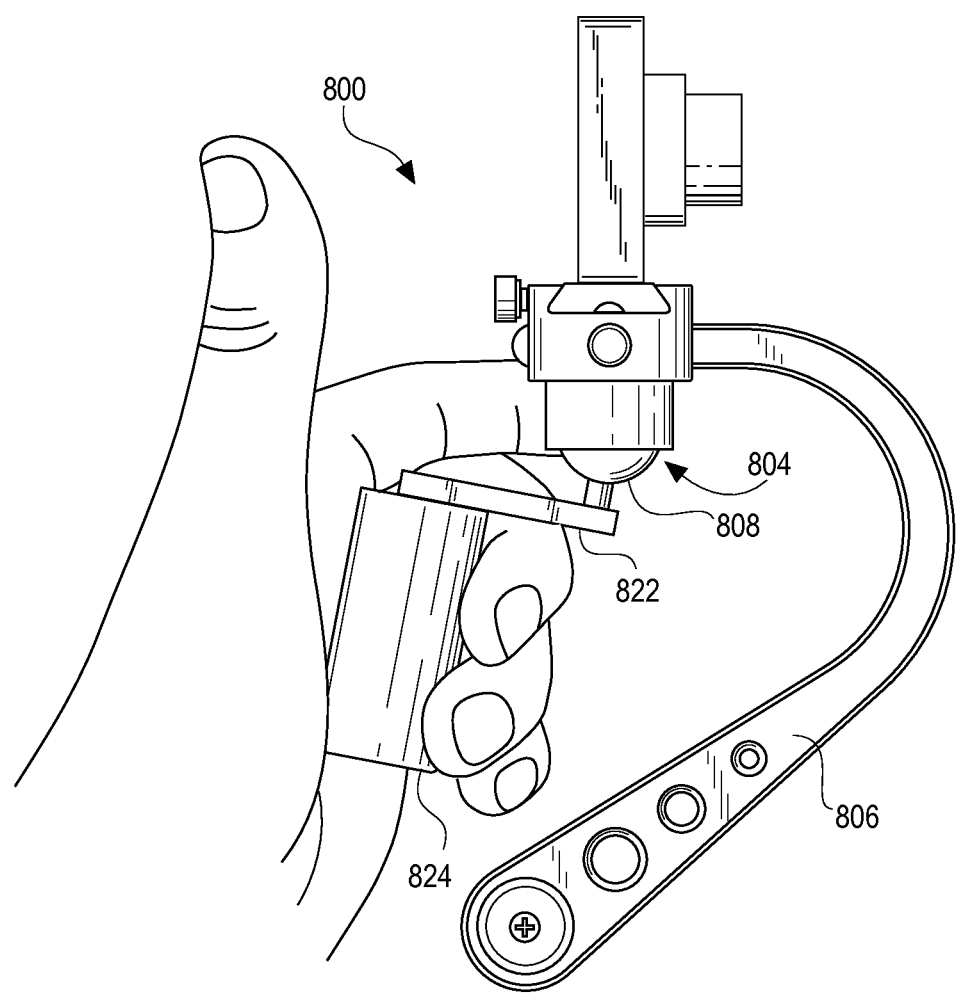
Figure 8C:
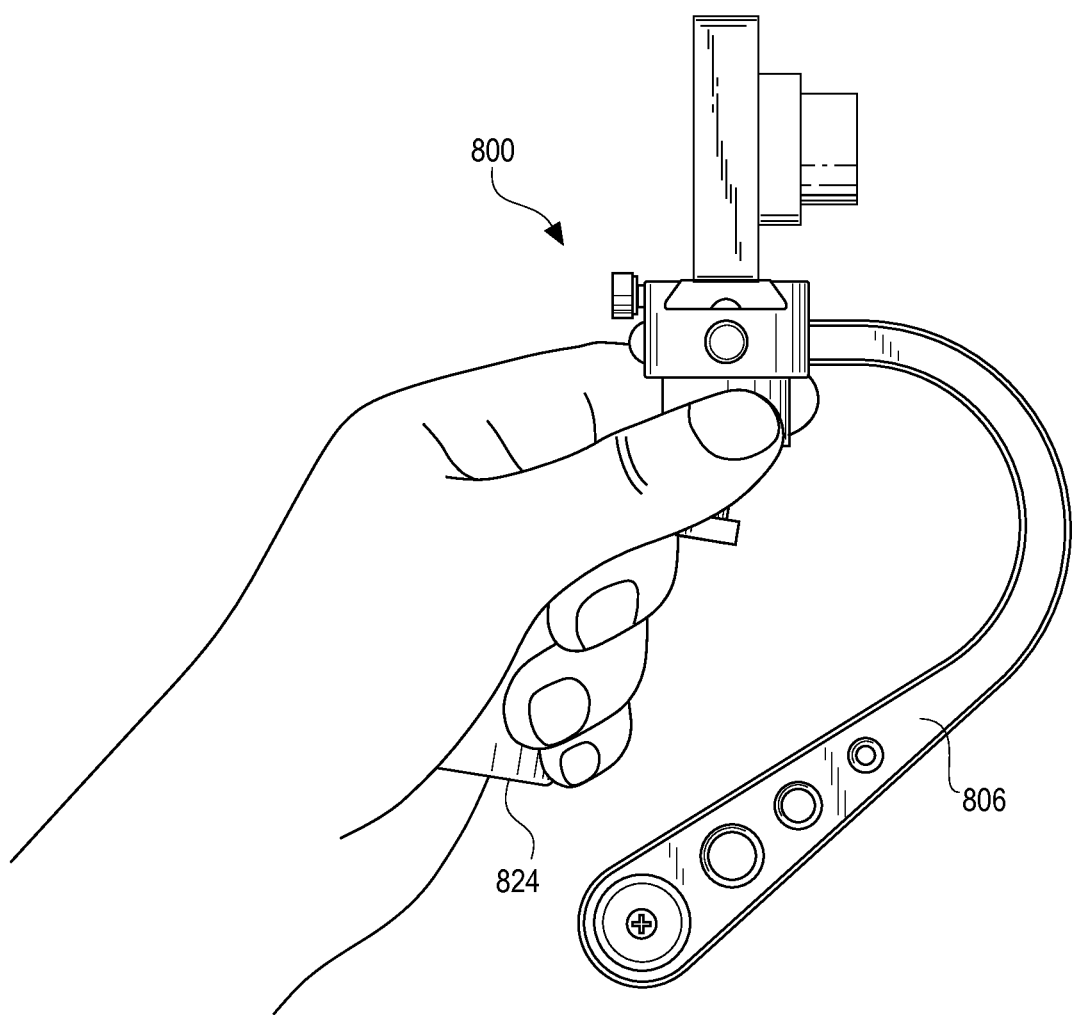

FIGS. 8A-C show positioning of a user's hand to hold and control a camera stabilizer 800. FIG. 8A shows a user initially grasping handle 824 roughly in the palm of his hand. The user's thumb is within reach of a control surface surrounding of gimbal component 804. FIG. 8B shows the user's index finger also in reach of the control surface of gimbal component 804 while the users remaining fingers grasp handle 824. FIG. 8C shows the users hand grasping handle 824 with the index finger and thumb in position to control gimbal component 804. Handle offset 822 is of a length to allow the users fingers to reach and control gimbal component 804 by affecting the motion of the camera allowed by gimbal 808. Typically this will be in a more natural and thus comfortable position than if the handle were directly below the gimbal component as in conventional camera stabilizers, thereby possibly enhancing control ability. In an illustrative embodiment of the invention the handle offset displaces the handled from a vertical line through the center of gravity of the camera stabilizer plus camera in a distance the range of about 1.0 inches to about 3.0 inches. A further illustrative range is about 1.5 inches to about 2.5 inches. 13. An illustrative distance range for the vertical distance from the top of the handle when the handle is disposed vertically to the vertical level of the center of the gimbal is about 0.25 inches to about inches 2.0 inches.

Balancing arm 806 can also be configured or shaped to accommodate the displacement of handle 824 from beneath gimbal component 804. As can be seen in FIGS. 8A-C balancing arm 806 clears the user's hand as he grasps handle 824.

Figure 9:
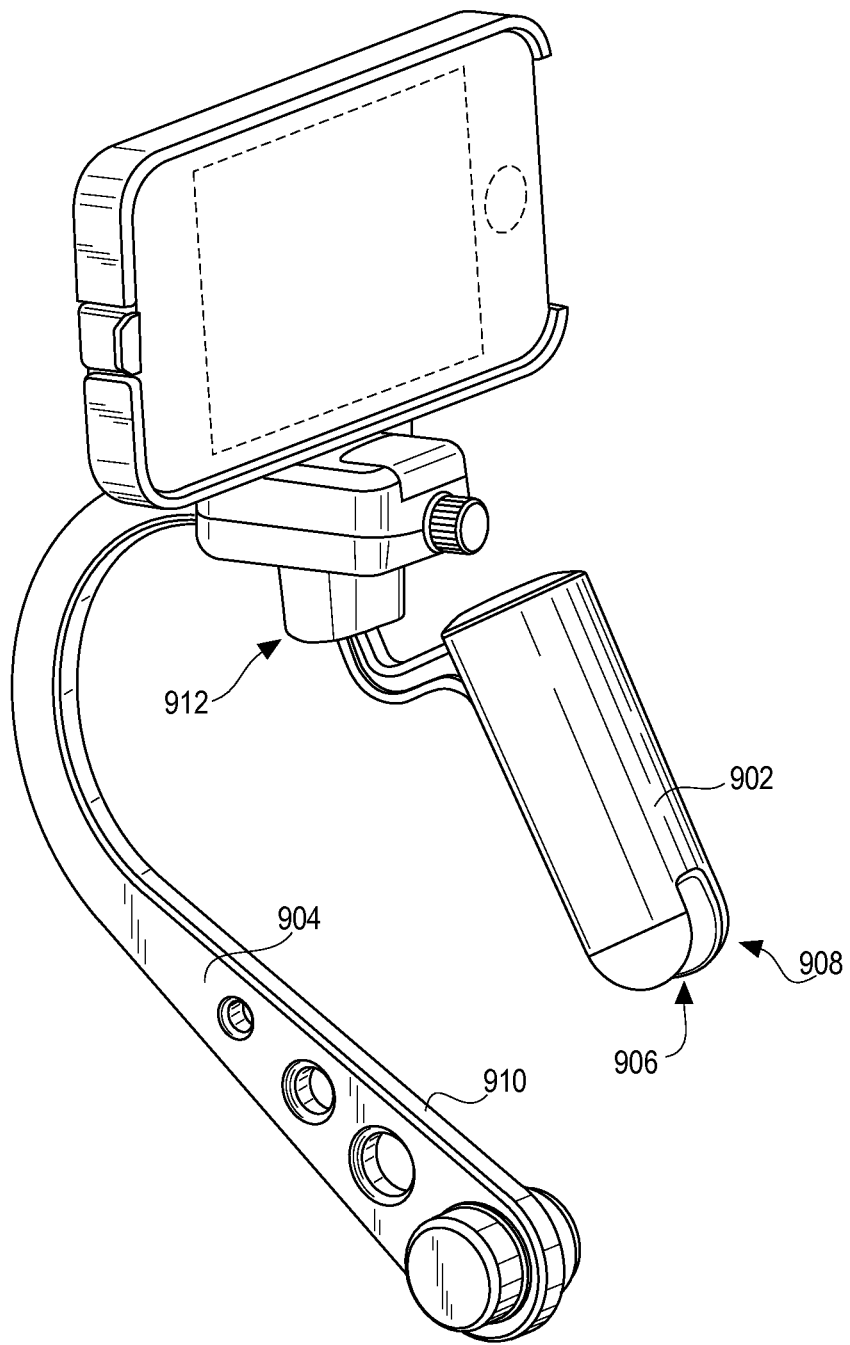
FIG. 9 depicts a camera stabilizer having a locking device to secure the handle to the balancing arm according to an illustrative embodiment of the invention.
Figure 10:
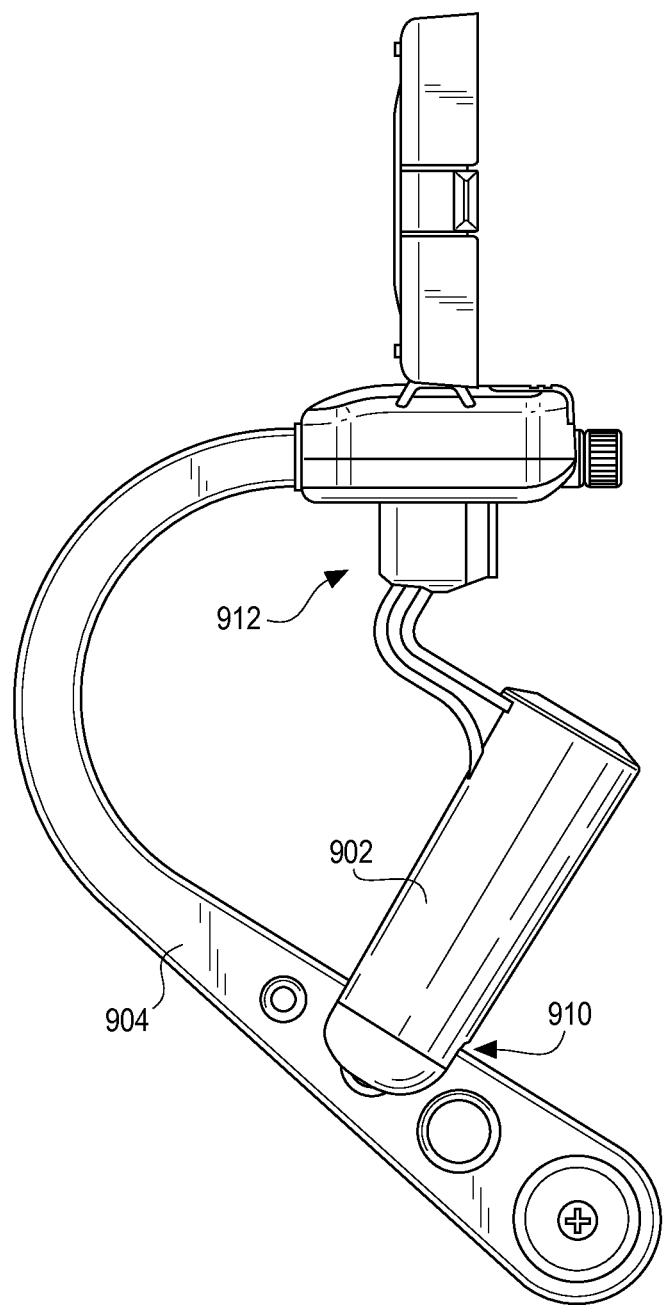
FIG. 10 depicts the camera stabilizer of FIG. 7 with the handle secured to the balancing arm according to an illustrative embodiment of the invention.
Figure 11:
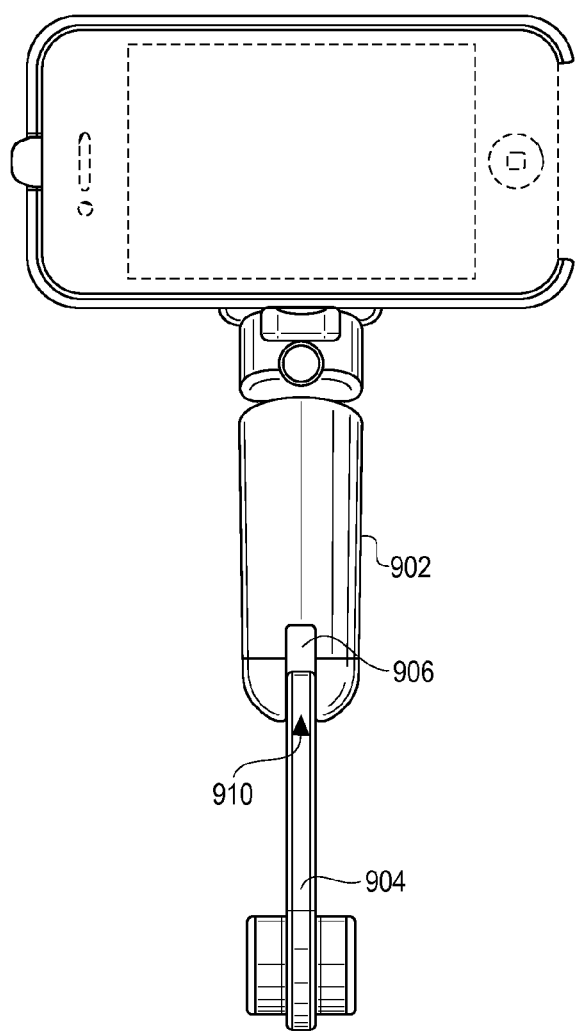
FIG. 11 depicts another view of the camera stabilizer of FIG. 7 with the handle secured to the balancing arm according to an illustrative embodiment of the invention.

FIGS. 9-11 illustrative a locking device in which handle 902 can be locked into balancing arm 904 according to an illustrative embodiment of the invention. As shown in FIG. 9, handle 902 has a notch 906 in its distal end 908. Notch 906 is complimentary in shape to an edge 910 of balancing arm 906. As depicted in FIG. 10, handle 902 can be rotated toward balancing arm 904 so that edge 910 is inserted into notch 906, thereby removeably securing the handle 902 in place for storage or use of the apparatus without motion or positioning influenced by gimbal component 912. FIG. 11 is another view showing handle 902 secured to balancing arm 904.

Figure 12:
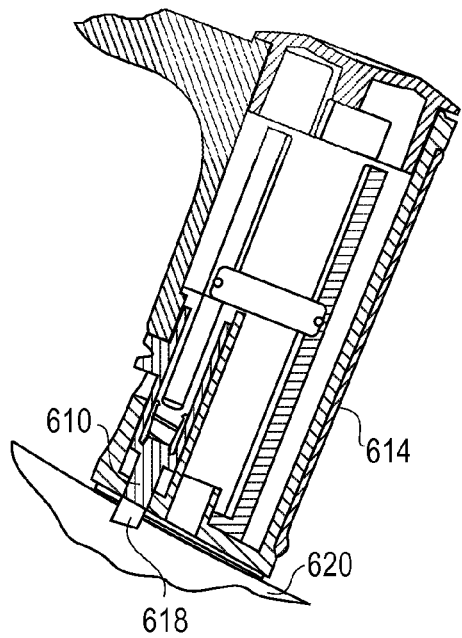
FIG. 12 is a cross-sectional view of a handle locking device in an unlocked configuration according to an illustrative embodiment of the invention.
Figure 13:
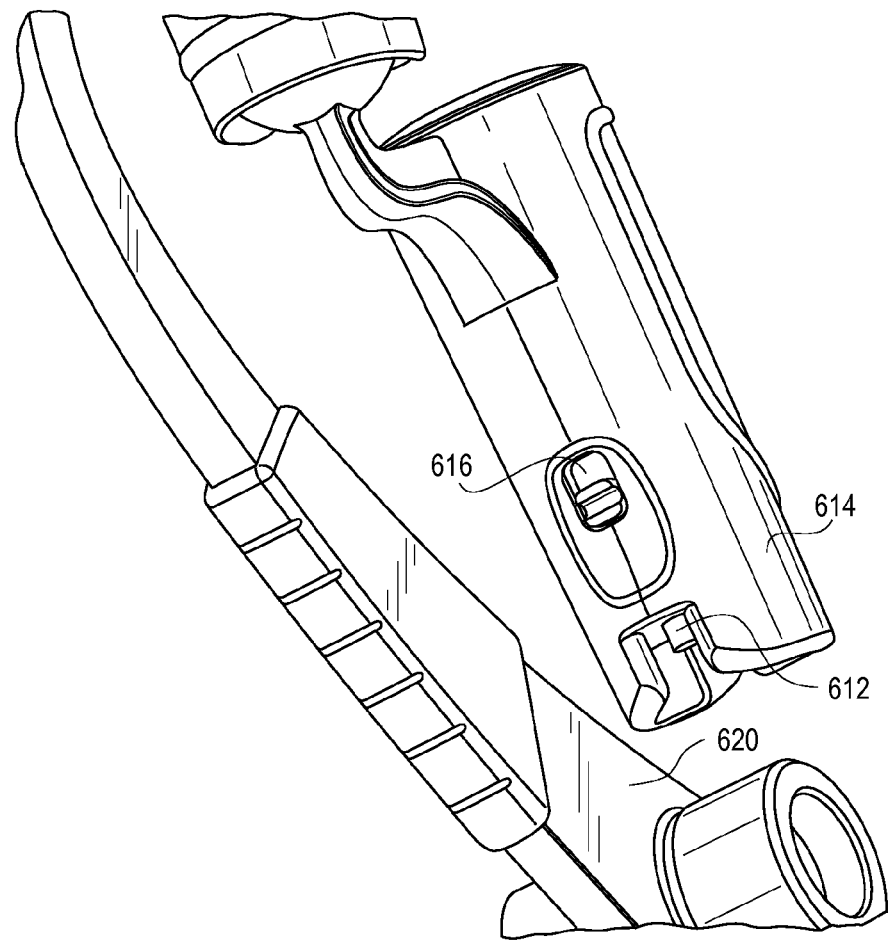
FIG. 13 depicts a handle with a locking device according to an illustrative embodiment of the invention.

Turning back to FIG. 6, a handle locking device is shown according to a further illustrative embodiment of the invention. As can be seen in FIG. 6 and also in FIG. 12, a locking pin 610 is provided, which is spring-loaded using spring 612. Locking pin 610 is positioned and sized to protrude into a locking hole 618 in balancing arm 620 when in an extended position. Locking pin 610 will automatically spring into position and lock handle 614 in place no matter what fore-aft position balancing arm 620 is in with respect to gimbal handle 614. Locking pin 610 can be disengaged by pushing up on a finger grip 616. FIG. 12 depicts the handle locking device in an unlocked position, wherein locking pin 610 is retracted from within locking hole 618. FIG. 6 depicts the handle locking device in a locked position, wherein locking pin 610 is inserted into locking hole 618. FIG. 13 depicts an exterior locking device view showing finger grip 616 disposed on handle 614, which is slid up to disengage locking pin 610 from locking hole 618. Spring 612 provides pressure to maintain locking pin 610 in the outward, locking position as its normal state.

A storage compartment for the weights can be provided in the handle. FIG. 6 shows weight 624 stored in handle 614. Weight 624 can be inserted into handle 614 by removing cap 628.

Figure 14:
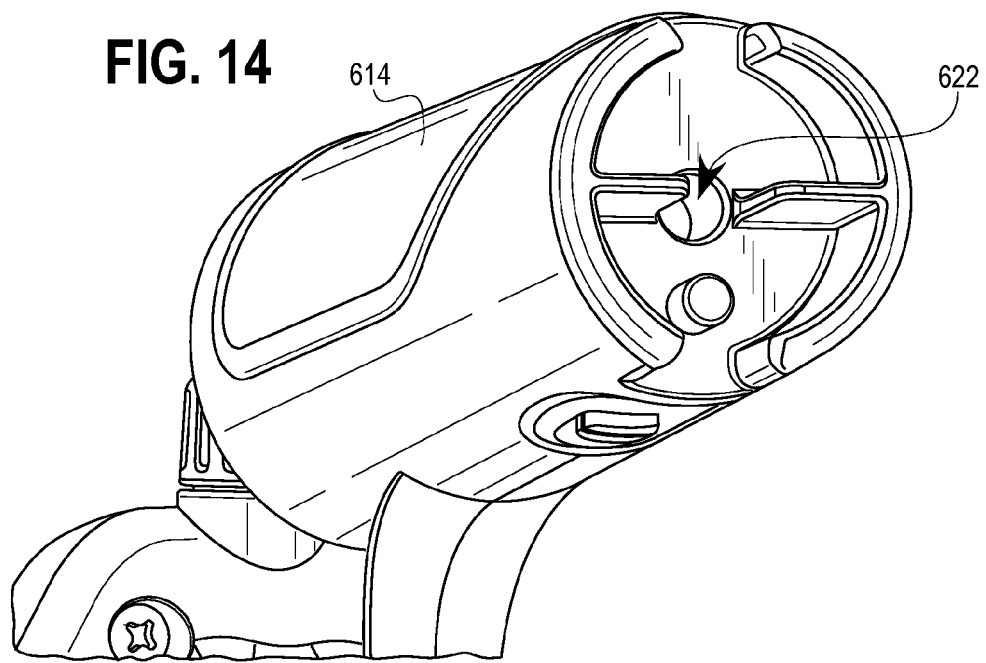
FIG. 14 depicts a handle having a device to hold a weight removal tool.

Weights may require or benefit from a tool for removal from handle 614. As shown in FIG. 14, such a tool can be inserted in handle 614 through hole 622 to help dislodge weights. The invention can include the aforementioned tool configured to dislodge the weights.

Since illustrative embodiments of the camera stabilizer can be held and controlled with one hand, the apparatus is particularly compatible for use with lightweight imaging devices, such as for example, those weighing less than five ounces, with an illustrative weight range of about 3 ounces to about 5 ounces. A further illustrative weight is about 6 ounces to about 16 ounces. Such devices may be for example, a Smartphone with video capabilities. Although useful with devices in these weight ranges, the stabilizing device can be configured for use with some payloads of greater or lesser weights.

The camera stabilizer can be manufactured from various materials and can be comprised of a plurality of components. As dictated in part by the function, some components can be integral with others or manufactured as separate elements affixed together either permanently or detachably. For example, the offset can be integral with the handle, i.e. manufactured as a single component, or comprise at least two components attached to one another. Lightweight materials, such as aluminum, may be particularly beneficial for use in constructing the balancing arm.

Various embodiments of the invention have been described, each having a different combination of elements. The invention is not limited to the specific embodiments disclosed, and may include different combinations of the elements disclosed or omission of some elements and the equivalents of such structures.

While the invention has been described by illustrative embodiments, additional advantages and modifications will occur to those skilled in the art. Therefore, the invention in its broader aspects is not limited to specific details shown and described herein. Modifications, for example to specific shapes and materials, may be made without departing from the spirit and scope of the invention. Accordingly, it is intended that the invention not be limited to the specific illustrative embodiments, but be interpreted within the full spirit and scope of the appended claims and their equivalents.

The invention claimed is:

1. A camera stabilizer comprising:
   a camera mount for attaching and positioning a camera;
   a gimbal component disposed below the camera mount and positioned at or near the center of gravity of the stabilizer plus camera;
   a balancing arm extending from above the gimbal component;
   a handle offset having a proximate end and a distal end, the handle offset extending from the gimbal component at the handle offset proximate end;
   a handle extending from the handle offset distal end such that the handle is offset from a line through the center of gravity of the stabilizer plus camera; and
   wherein when the distance between the handle and the gimbal provided by the offset is such that when the handle is gripped by a user's hand, the user's fingers of that hand are within reach of a control surface on the gimbal component allowing control of the camera stabilizer with the user's fingers.

2. The camera stabilizer of claim 1 wherein the distance between the handle and the gimbal component provided by the offset is such that when the user grips the handle the user's thumb and index finger are within reach of the control surface on the gimbal component.

3. The camera stabilizer of claim 1 wherein the balancing arm comprises one or more positions for incorporation of one or more weights.

4. The camera stabilizer of claim 3 wherein the handle comprises a storage compartment for the one or more weights.

5. The camera stabilizer of claim 1 further comprising a locking device to lock the handle to the balancing arm.

6. The camera stabilizer of claim 5 wherein the handle has a distal end, wherein the locking device comprises:
- a notch in the handle distal end complimentary in shape to an edge of the balancing arm and positioned so that when the handle is rotated toward the balancing arm edge, the balancing arm edge fits into the notch, thereby removeably securing the handle to the balancing arm.

7. The camera stabilizer of claim 6 comprising:
- a locking hole disposed in the balancing arm;
- a spring-loaded locking pin disposed in the handle and positioned and sized to extend into the locking hole when in an extended position; and
- a finger guide disposed in the handle and functionally engaged with the locking pin to retract the locking pin.

8. The camera stabilizer of claim 1 configured to stabilize a camera having a weight of about 6 ounces to about 16 ounces.

9. The camera stabilizer of claim 8 configured to stabilize a camera having a weight in the range of about 3 ounces to about 5 ounces.

10. The camera stabilizer of claim 2 wherein the handle offset displaces the handle from a vertical line through the center of gravity of the camera stabilizer plus camera a distance in the range of about 1.0 inches to about 3.0 inches.

11. The camera stabilizer of claim 10 wherein the handle offset displaces the handle from a vertical line through the center of gravity of the camera stabilizer plus camera a distance in the range of about 1.5 inches to about 2.5 inches.

12. The camera stabilizer of claim 2 wherein the distance between the handle and the gimbal component provided by the offset is adjustable.

13. The camera stabilizer of claim 1 wherein the vertical distance from the top of the handle when the handle is disposed vertically to the vertical level of the center of the gimbal is in the range of about 0.25 inches to about inches 2.0 inches.

14. The camera stabilizer of claim 1 wherein the vertical distance from the top of the handle when the handle is disposed vertically to the vertical level of the center of the gimbal is adjustable.

15. The camera stabilizer of claim 1 having a weight adjustment mechanism comprising:
- an adjustable weight attachable to the balancing arm and adjustable in the x direction thereby capable of varying the distribution of weight on either side of the balancing arm.

16. The camera stabilizer of claim 15 wherein the adjustable weight comprises:
- an outer weight adjustably insertable in the balancing arm; and
- an inner weight adjustably nested in the outer weight.

17. The camera stabilizer of claim 1 further comprising:
- a raised guide element on the control surface capable of providing a reference point for suitable finger placement.

18. The camera stabilizer of claim 4 comprising:
- an opening in the handle sized to hold a tool to dislodge weights stored in the handle.

19. The camera stabilizer of claim 1 further comprising a camera.

20. A method of stabilizing a camera comprising:
- providing a camera stabilizer according to claim 1;
- attaching a camera to the camera stabilizer;
- adjusting the balancing arm and the mount so the center of gravity coincides with the gimbal.

* * * * *